US009615051B2

(12) United States Patent
Seki et al.

(10) Patent No.: US 9,615,051 B2
(45) Date of Patent: Apr. 4, 2017

(54) PERFORMING VIDEO PROCESSING FOR FRAME SEQUENTIAL DISPLAY FOR ALTERNATELY DISPLAYING RIGHT AND LEFT IMAGES OF STEREOSCOPIC VIDEO SIGNALS

(75) Inventors: Yukinaga Seki, Kyoto (JP); Hidetoshi Takeda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 930 days.

(21) Appl. No.: 13/542,109

(22) Filed: Jul. 5, 2012

(65) Prior Publication Data
US 2012/0281070 A1 Nov. 8, 2012

Related U.S. Application Data (63) Continuation of application No. PCT/JP2011/004934, filed on Sep. 2, 2011.

(30) Foreign Application Priority Data

Mar. 3, 2011 (JP) ................................. 2011-046702

(51) Int. Cl.
*H04N 7/01* (2006.01)
*H04N 13/00* (2006.01)
(52) U.S. Cl.
CPC ............. *H04N 7/012* (2013.01); *H04N 7/014* (2013.01); *H04N 13/0007* (2013.01)
(58) Field of Classification Search
None
See application file for complete search history.

(56) References Cited

U.S. PATENT DOCUMENTS 5,469,222 A * 11/1995 Sprague ................... H04N 5/14
348/458
6,335,985 B1 * 1/2002 Sambonsugi ........ G06K 9/3241
382/190

(Continued)

FOREIGN PATENT DOCUMENTS

JP          07-274209          10/1995
JP       2000-041201 A         2/2000

(Continued)

OTHER PUBLICATIONS

International Search Report issued in International Patent Application No. PCT/JP2011/004934 dated Nov. 15, 2011.

*Primary Examiner* — Geepy Pe
(74) *Attorney, Agent, or Firm* — McDermott Will & Emery LLP (57) ABSTRACT

A stereoscopic video processing system includes an output image generator configured to generate interpolation frames in interpolation phases using the frames of the input video signal and the motion vector and output the frames of the input video signal or the interpolation frames as the frames of an output video signal. The stereoscopic video processing system further includes an output controller configured to (i) determine whether frames of the input video signal include image regions with motion based on the motion vector, (ii) control the output image generator to output the interpolation frames upon determining the frames of the input video signal include the image regions with motion, and (iii) control the output image generator to output the frames of the input video signal upon determining the frames of the input video signal does not include image regions with motion.

20 Claims, 9 Drawing Sheets

(56) References Cited

U.S. PATENT DOCUMENTS

2009/0231314 A1    9/2009   Hanaoka et al.
2010/0053306 A1    3/2010   Hirasawa et al.

FOREIGN PATENT DOCUMENTS

| | | |
|---|---|---|
| JP | 2008-252731 | 10/2008 |
| JP | 2008-252731 A | 10/2008 |
| JP | 2010-062695 | 3/2010 |
| JP | 2010-074337 A | 4/2010 |

\* cited by examiner

PERFORMING VIDEO PROCESSING FOR FRAME SEQUENTIAL DISPLAY FOR ALTERNATELY DISPLAYING RIGHT AND LEFT IMAGES OF STEREOSCOPIC VIDEO SIGNALS

CROSS-REFERENCE TO RELATED APPLICATION

This is a continuation of PCT International Application PCT/JP2011/004934 filed on Sep. 2, 2011, which claims priority to Japanese Patent Application Number 2011-046702 filed on Mar. 3, 2011. The disclosures of these applications including the specifications, the drawings, and the claims are hereby incorporated by reference in their entirety.

TECHNICAL FIELD

The present disclosure relates to a stereoscopic video processing system, and more particularly to a stereoscopic video processing system configured to perform video processing for frame sequential display for alternately displaying right and left images of stereoscopic video signals.

BACKGROUND

In recent years, 3D movies of a binocular disparity type have been rapidly spread, which provide right and left eyes of viewers with different images so that the viewers recognize the three-dimensional effect. Showing 3D movies at theaters and watching 3D movies at home with 3D enabled devices are becoming common.

The 3D enabled devices for watching 3D movies at home usually employ liquid crystal shutter glasses. With the liquid crystal shutter glasses, right and left images are alternately displayed on a display (i.e., frame sequential display). A viewer wears the liquid crystal shutter glasses, which shut images coming into the right or left eye in synchronization with the display of an image. This allows the viewer to recognize the right image with the right eye, and the left image with the left eye. As a result, the viewer perceives the three-dimensional effect created by the binocular disparity between the right and left images.

Figure 6:
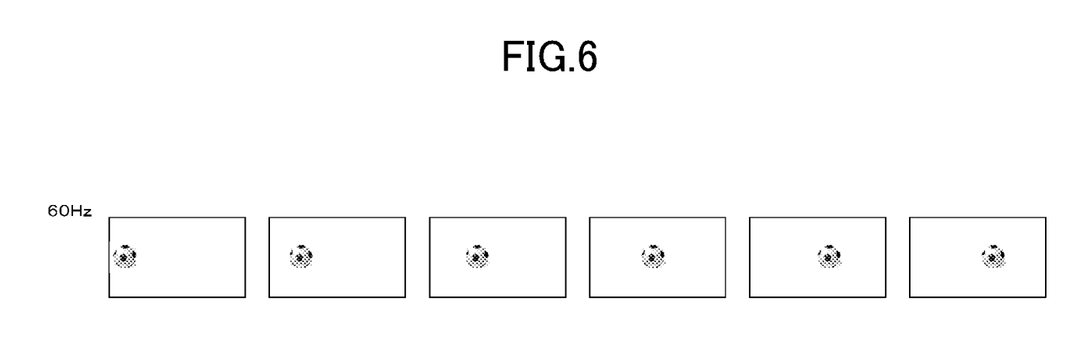
FIG. 6 illustrates the movement of a ball in filmed images.
Figure 7:
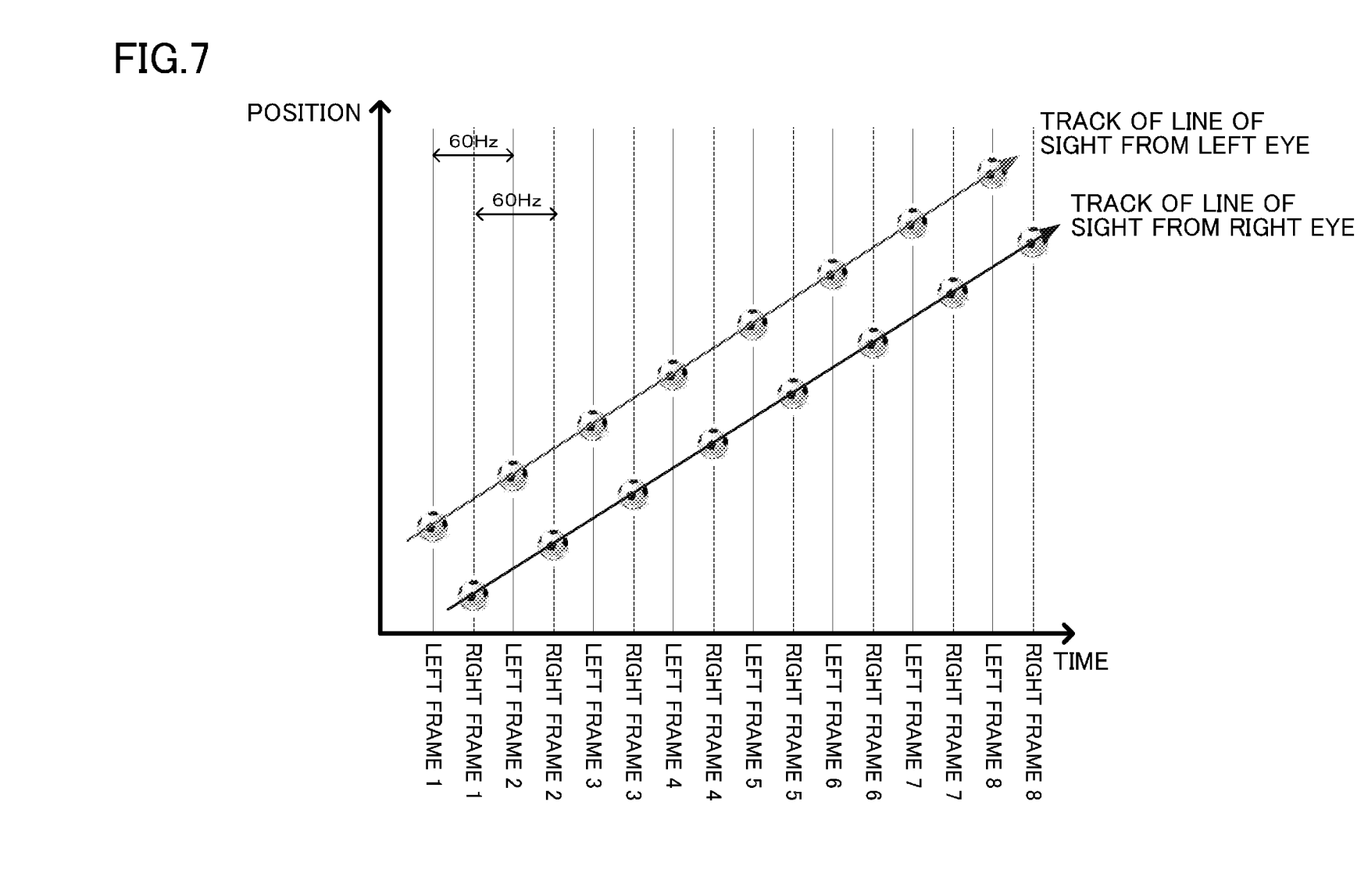
FIG. 7 illustrates the relationship between time and a display position of a ball in a displayed image, where the right and left images of the scene of the ball crossing a screen as shown in FIG. 6 are filmed in 3D at 60 Hz and alternately provided by frame sequential display at 120 Hz.

FIG. 7 illustrates the relationship between time and a display position of a ball in a displayed image, where the right and left images of the scene of the ball crossing a screen as shown in FIG. 6 are filmed in 3D at 60 Hz and alternately provided by frame sequential display at 120 Hz. In general, stereoscopic video images are filmed by synchronizing right and left images. When provided by frame sequential display, the right and left images lag behind each other by 1/120 second. When a human views something moving uniformly like this example, it is known that the line of sight moves so as to follow the motion. In FIG. 7, the line of sight follows the displayed ball, and moves along the track of the line of sight. Thus, as shown in FIG. 7, at the time when a one-eye image is displayed, the line of sight from the other eye lags by 0.5 frame in accordance with the direction in which an object moves.

Figure 8:
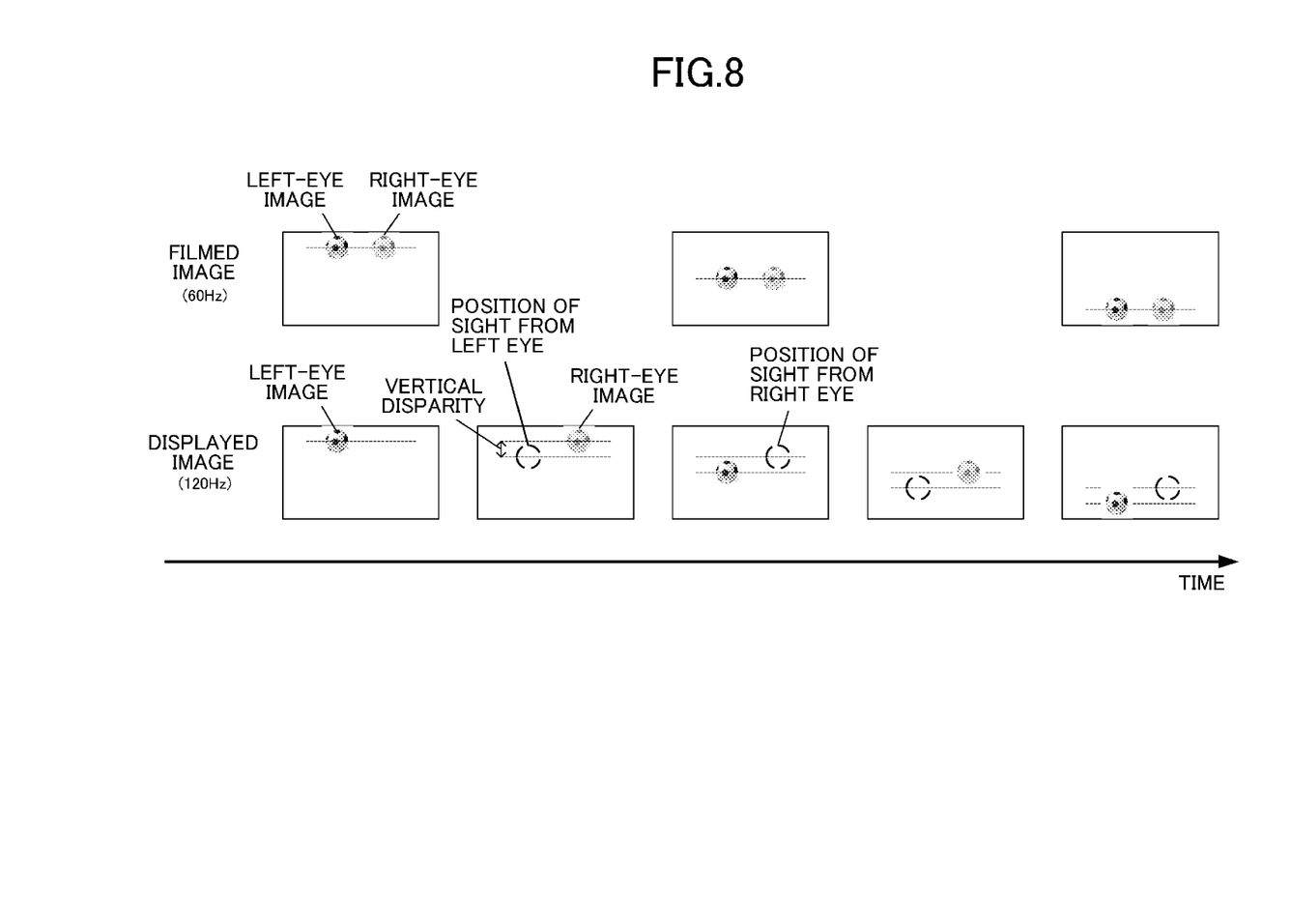
FIG. 8 illustrates the appearance of a stereoscopic video image where a scene with motion in a longitudinal direction is provided by frame sequential display.
Figure 9:
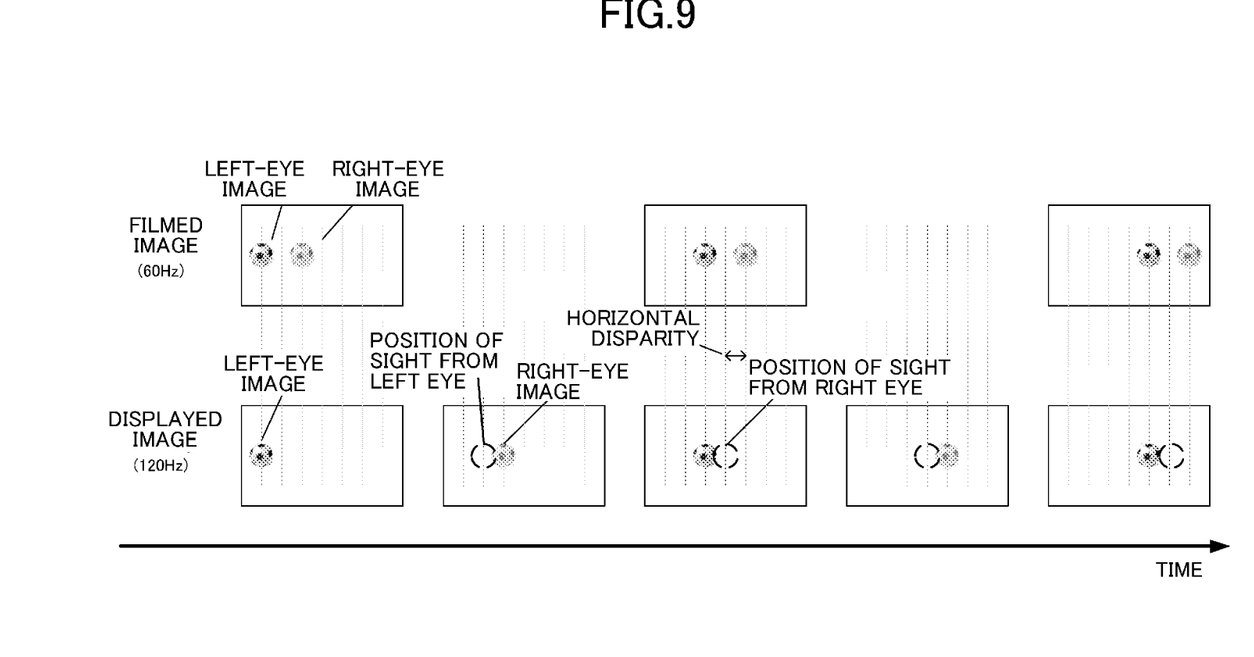
FIG. 9 illustrates the appearance of a stereoscopic video image where a scene with motion in a lateral direction is provided by frame sequential display.

For example, as shown in FIG. 8, when the scene of a ball moving in a longitudinal direction is filmed in 3D and provided by frame sequential display, the lines of sight from right and left eyes lag behind each other in the longitudinal direction by the degree corresponding to the movement of the object for 0.5 frame. The lag between the lines of sight from right and left eyes in the vertical direction may influence ease of viewing the stereoscopic video image, thereby causing eyestrain. For another example, as shown in FIG. 9, when the scene of a ball moving in a lateral direction is filmed in 3D and provided by frame sequential display, the lines of sight from right and left eyes lag behind each other in the lateral direction by the degree corresponding to the movement of the object for 0.5 frame. The lag between the lines of sight from right and left eyes in the horizontal direction may influence the 3D effect of the stereoscopic video image. For example, the lag between the lines of sight from right and left eyes in the horizontal direction may result in perceiving the image closer or further away than the actual location of the image.

As a result, the lag between the lines of sight from right and left eyes in horizontal and vertical directions can reduce the quality of display of stereoscopic images. Therefore, there is a need for a stereoscopic video processing system capable of improving the quality of display of stereoscopic images.

SUMMARY

In one general aspect, the instant application describes a stereoscopic video processing system that includes a vector detector configured to detect a motion vector associated with frames of an input video signal; an output image generator configured to generate interpolation frames in interpolation phases using the frames of the input video signal and the motion vector and output the frames of the input video signal or the interpolation frames as the frames of an output video signal; and an output controller configured to (i) determine whether frames of the input video signal include image regions with motion based on the motion vector, (ii) control the output image generator to output the interpolation frames upon determining the frames of the input video signal include the image regions with motion, and (iii) control the output image generator to output the frames of the input video signal upon determining the frames of the input video signal does not include image regions with motion.

The above general aspect may include one or more of the following features. The output controller may be configured to control the output image generator to generate the interpolation frames by generating an interpolation image for only the image region with motion. The output controller may be configured to control the output image generator to gradually change the interpolation phases of the interpolation frames. The output controller may be configured to determine whether or not motion occurs in an image region of each of the frames of the input video signal based on a value obtained by weighting and adding a component of the motion vector in a longitudinal direction of the frames of the input video signal and a component of the motion vector in a lateral direction of the frames of the video signal.

The output controller may be configured to determine whether or not motion occurs in an image region of each of the frames of the input video signal based on a component of the motion vector in a longitudinal direction of the frames of the input video signal. The output controller may be configured to determine whether or not motion occurs in an image region of each of the frames of the input video signal based on a component of the motion vector in a lateral direction of the frames of the input video signal.

The stereoscopic video processing system may be configured to generate a right output video signal from a right input video signal and a left output video signal from a left input video signal. The output image generator may be configured to shift a phase of one of the right and left input video signals by 0.5 frame to generate the interpolation frames. The output image generator may be configured to shift a phase of each of the right and left input video signals to generate the interpolation frames. The output image generator may be configured to advance a phase of one of the right and left input video signals by 0.25 frame and delay a phase of an other of the right and left input video signals by 0.25 frame to generate the interpolation frames.

The stereoscopic video processing system may include a right image processor for processing a right input video signal and a left image processor for processing a left input video signal. The right image processor may include the vector detector, the output image generator, and the output controller. The left image processor may include the vector detector, the output image generator, and the output controller. The stereoscopic video processing system may time-share a single image processor including the vector detector, the output image generator, and the output controller to process a right input video signal and a left input video signal.

The stereoscopic video processing system may be configured to generate a right output video signal from a right input video signal and a left output video signal from a left input video signal, the vector detector may be configured to detect a motion vector of each block of the frames of the input video signal. The output image generator may be configured to generate interpolation frames in interpolation phases such that positions of the right and left output video signals coincide with each other along the time axis of frames.

In another general aspect, the instant application describes a stereoscopic video display system that includes an input image selector configured to receive a stereoscopic video signal and output a right input video signal and a left input video signal. The stereoscopic video display system also includes the above-described stereoscopic video processing system to process the right and left input video signals; and a display configured to perform frame sequential display of a right output video signal and a left output video signal, each being output from the stereoscopic video processing system.

In another general aspect, the instant application describes a stereoscopic video processing method comprising steps of: detecting a motion vector associated with frames of an input video signal; determining whether the frames of the input video signal include image regions with motion based on the motion vector; upon determining the frames of the input video signal include the image regions with motion, generating interpolation frames in interpolation phases using the frames of the input video signal and the motion vector and outputting the interpolation frames as frames of an output video signal; and upon determining the frames of the input video signal does not include the image regions with motion, outputting the frames of the input video signal as the frames of the output video signal.

The above general aspect may include one or more of the following features. Generating the interpolation frames may include generating an interpolation image for only the image region with motion. In generating the interpolation frames, the interpolation phases of the interpolation frames may gradually change. Determining whether the frames of the input video signal include the image regions with motion may include determining whether the frames of the input video signal include the image regions with motion based on a value obtained by weighting and adding a component of the motion vector in a longitudinal direction of the frames and a component of the motion vector in a lateral direction of the frames.

Determining whether the frames of the input video signal include the image regions with motion may include determining whether the frames of the input video signal include the image regions with motion based on a component of the motion vector in a longitudinal direction of the frames. Determining whether the frames of the input video signal include the image regions with motion may include determining whether the frames of the input video signal include the image regions with motion based on a component of the motion vector in a lateral direction of the frames.

The method may further include a step of generating a right output video signal from a right input video signal and a left output video signal from a left input video signal, wherein in the generating the interpolation frames, a phase of one of the right and left input video signals may be shifted by 0.5 frame to generate the interpolation frames. The method may further include a step of generating a right output video signal from a right input video signal and a left output video signal from a left input video signal, wherein in the generating the interpolation frames, a phase of each of the right and left input video signals may be shifted to generate the interpolation frames. In generating the interpolation frames, the phase of one of the right and left input video signals may be advanced by 0.25 frame, and the phase of an other of the right and left input video signal may be delayed by 0.25 frame to generate the interpolation frames.

BRIEF DESCRIPTION OF THE DRAWINGS

The figures depict one or more implementations in accord with the present teachings, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without exemplary details. In other instances, well known methods, procedures, components, and circuitry have been described at a relatively high-level, without detail, in order to avoid unnecessarily obscuring aspects of the present concepts.

In exchange for the present disclosure herein, the Applicants desire all patent rights described in the claims. Therefore, the patent rights are not intended to be limited or restricted by the following detailed description and accompanying figures.

The instant application provides a stereoscopic video processing system configured to improve the quality of display of stereoscopic video images. The stereoscopic video processing system of the instant application may generate interpolation frames while shifting the phases in which the object is displayed in accordance with timing lag of display, where an image includes a moving object, and may output the interpolation frames as the frames of the output video signal. As a result, the stereoscopic video processing system of the instant application may allow for display of a stereoscopic video image causing less eyestrain and may allow a viewer to more accurately perceive the three-dimensional effect. On the other hand, where the image includes no moving object, the stereoscopic video processing system of the instant application may output the frames of the input video signal as the frames of the output video signal without change. As a result, the stereoscopic video processing system of the instant application may reduce the deterioration in the image quality caused by an interpolation error.

Figure 1:
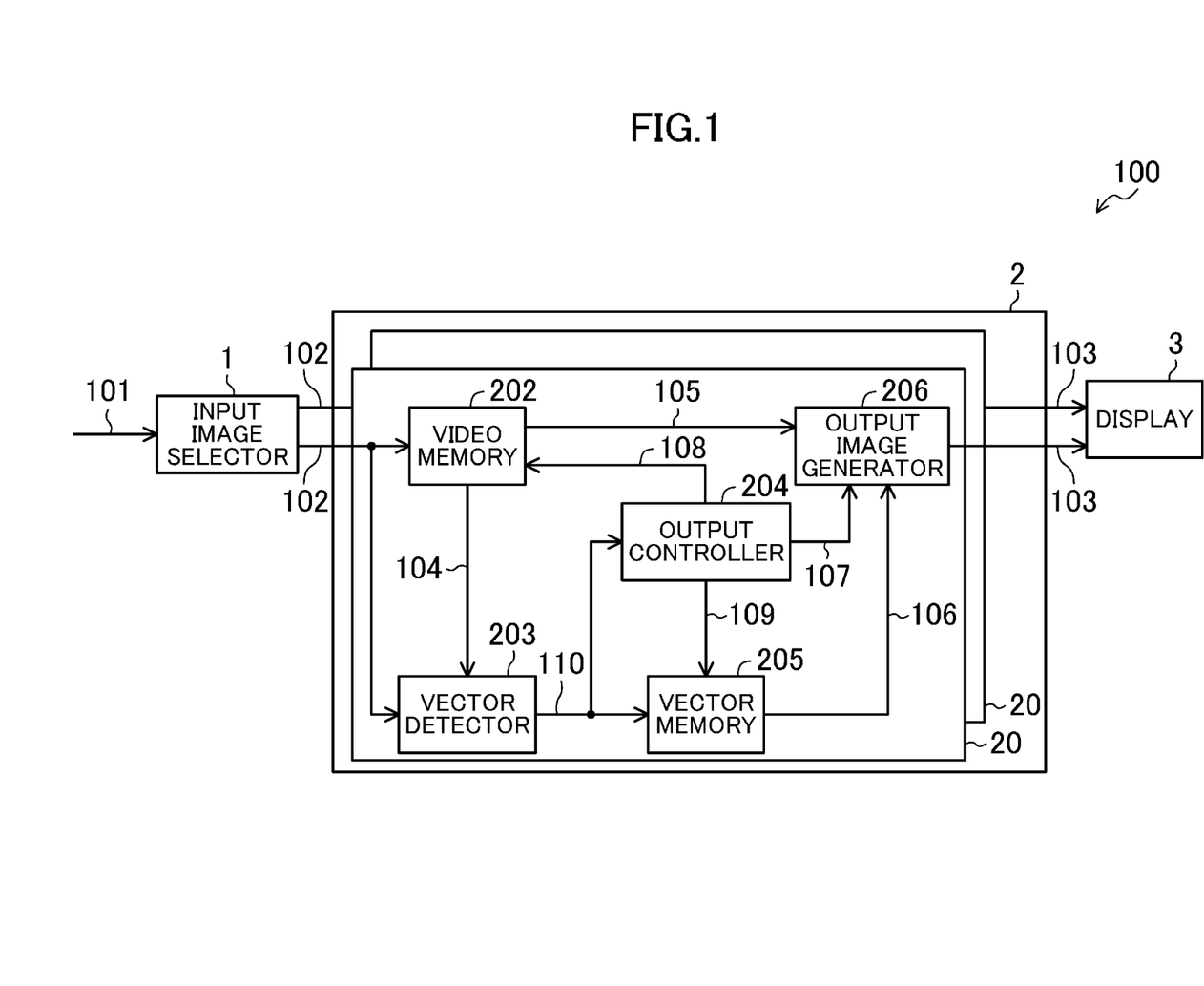
FIG. 1 illustrates an exemplary stereoscopic video display system of the instant application.

FIG. 1 illustrates an exemplary stereoscopic video display system 100 of the instant application. The stereoscopic video display system 100 includes an input image selector 1, a stereoscopic video processing system 2, and a display 3. The stereoscopic video processing system 2 includes right and left image processors 20, each of which includes a video memory 202, a vector detector 203, an output controller 204, a vector memory 205, and an output image generator 206.

The input image selector 1 divides an input stereoscopic video signal 101 into right and left input video signals 102 and outputs the signals 102 to the stereoscopic video processing system 2. The stereoscopic video signal 101 alternately includes right and left images of a frame frequency of 60 Hz. The stereoscopic video processing system 2 detects a motion vector between frames of each of the right and left input video signals 102, generates interpolation frames using the motion vector, and generates right and left output video signals 103. Specifically, the right image processor 20 detects a motion vector between frames of the right input video signal 102, generates interpolation frames using the motion vector, and generates the right output video signal 103. The left image processor 20 detects a motion vector between frames of the left input video signal 102, generates interpolation frames using the motion vector, and generates the left output video signal 103. The right and left output video signals 103 output from the stereoscopic video processing system 2 have a frame frequency of 60 Hz.

The display 3 receives the right and left output video signals 103 output from the stereoscopic video processing system 2 and performs frame sequencing by alternately displaying the right and left output video signals 103 at 120 Hz. The display 3 may be an LCD display, a PDP display, etc. and is not particularly limited, as long as it can display stereoscopic video signals. As described above, the stereoscopic video display system 100 displays the input stereoscopic video signal 101 of 60 Hz by frame sequential display at 120 Hz.

Next, an example will be described where the phase of the input video signal 102 of 60 Hz is shifted by 0.5 frame in an image processor 20 to generate the output video signal 103 of 60 Hz.

The input image selector 1 outputs the input video signal 102 to the image processors 20. At the image processors 20, the input video signal 102 is received at the vector detector 203 and the video memory 202. The video memory 202 is a memory configured to store at least 3 frames of the input video signal and output preferred one of the stored frames to the output image generator 206. The video memory 202 is also configured to output one frame earlier than the present frame (e.g., the previous frame) to the vector detector 203. The vector detector 203 divides the input video signal 102 into blocks of, for example, 8×8 pixels, and detects the motion vector of each block by searching the position having the highest correlation with a previous frame video signal 104 which is input from the video memory 202.

Figure 2:
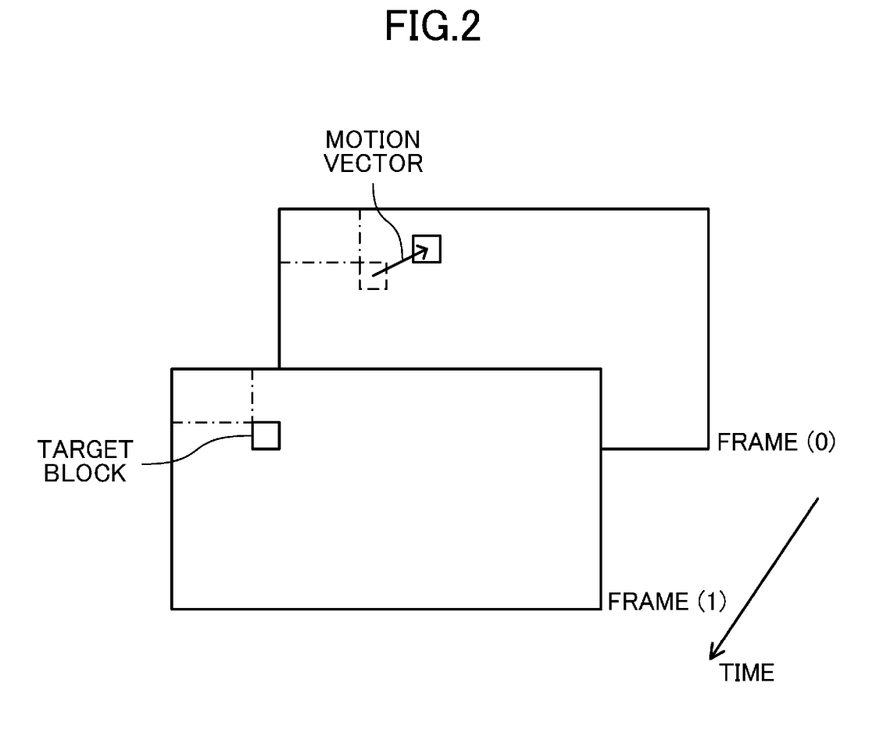
FIG. 2 illustrates an exemplary motion vector detected between two frames of an input signal.

FIG. 2 illustrates an exemplary motion vector detected between two frames of the input signal. As shown, for a target block selected on frame (1), the position having the highest correlation with the target block is searched on frame (0) which is one frame earlier, and the difference between the positions is detected as the motion vector. In one implementation, the search may be performed within the range of, for example, ±64 pixels horizontally and ±32 lines vertically from the block in which the motion vector is detected, and the position having the highest correlation in the range may be obtained. A correlation value may be the Sum of Absolute Differences (SAD), which is calculated by summing absolute differences in the entire block between the values of the pixels contained in the block and the respective values of the pixels contained in the block to be compared. The size of each block is not limited thereto, and may be greater or smaller. In addition, correlation values other than the SAD may be used. As a searching method, numbers of known techniques for reducing the processing amount and efficiently detecting motion vectors may be used.

Referring again to FIG. 1, the vector detector 203 outputs to the vector memory 205, a motion vector 110 detected from the input video signal 102, and the previous frame video signal 104. The vector memory 205 is a memory configured to store the motion vector 110 detected by the vector detector 203 and to absorb the time difference between writing by the vector detector 203 and reading by the output image generator 206, which will be described later. The vector memory 205 may have the capacity corresponding to the time difference. In one implementation, the vector memory 205 stores two motion vectors for two frames of the input video image. In another implementation, the vector memory 205 stores more than two motion vectors.

The output controller 204 determines which one of the motion vectors corresponding to two frames stored in the vector memory 205 is to be read, which two frames are to be read as the previous and next frames among a plurality of frames stored in the video memory 202 for generating an interpolation frame, and in which phase between the previous and next frames the interpolation frame is to be generated. Based on the result of these determinations, the output controller 204 outputs control signals. The control signals include an interpolation phase control signal 107, a frame selection signal 108, and a vector selection signal 109. Since the interpolation frames are generated at 60 Hz, which is also the frame frequency of the output video signal 103, the control signals from the output controller 204 are also output at a frequency of 60 Hz.

The video memory 202 receives from the output controller 204 the frame selection signal 108 for determining two frames to be used for interpolation and outputs to the output image generator 206, the two frames designated by the frame selection signal 108 as a previous and next frame video signal 105. The vector memory 205 receives from the output controller 204 the vector selection signal 109 for selecting the vector motion to be used for the interpolation and outputs the selected motion vector designated by the vector selection signal 109 as a motion vector 106 for interpolation to the output image generator 206. The specific operation of the output controller 204 will be described below with reference to FIG. 3.

Figure 3:
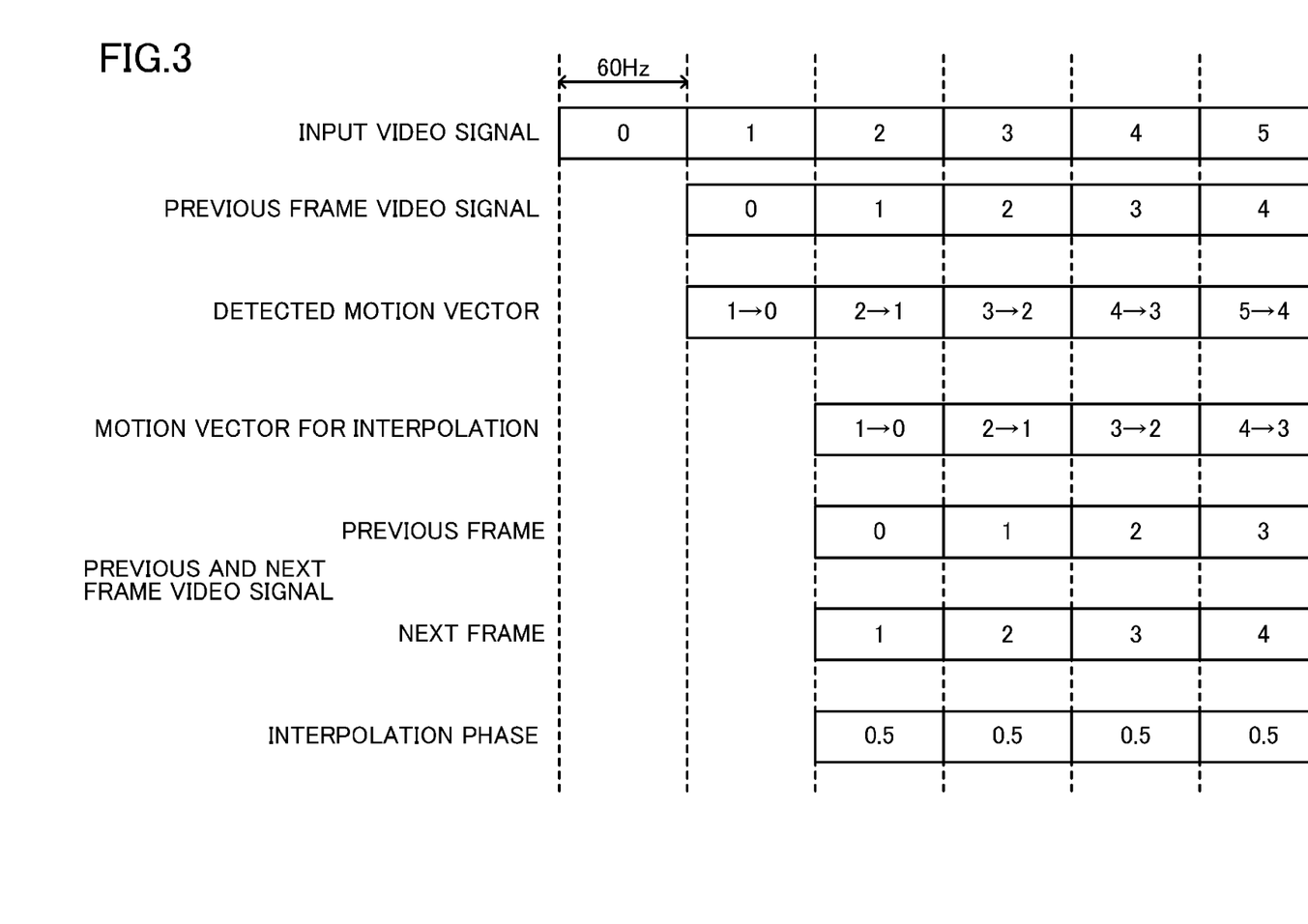
FIG. 3 illustrates an exemplary timing relationship between an input video signal, a previous frame video signal, a detected motion vector, a motion vector for interpolation, a previous and next frame video signal, and an interpolation phases.

FIG. 3 illustrates an exemplary timing relationship between the input video signal 102, the previous frame video signal 104, the detected motion vector 110, the motion vector 106 for interpolation, the previous and next frame video signal 105, and the interpolation phases 107. The motion vectors 110 are detected at 60 Hz, which is a frame frequency of the input video signal 102. The motion vector, which is detected between the frame (1) of the input video signal 102 and frame (0) input as the previous frame video signal 104, is written to the vector memory 205. Other motion vectors detected between other input frames may be similarly written to the vector memory 205.

The generated video signal for the frame (0) and frame (1) of the input video signal 102 is a frame having (0.5) interpolation phase. To this end, the output controller 204 outputs (0.5) as the interpolation phase control signal 107. The output controller 204 also outputs as the vector selection signal 109, a signal for selecting the motion vector detected between the frames (1) and (0) as the motion vector 106 for interpolation. Additionally, the output controller 204 outputs the frame selection signal 108 for outputting the frames (0) and (1) as the previous and next frame video signal 105.

As described above, the output controller 204 appropriately selects an input frame and a motion vector needed for generating an interpolation frame, and outputs control signals for inputting the input frame and the motion vector to the output image generator 206. At the same time, the output controller 204 outputs the interpolation phase control signal 107 to the output image generator 206. The output image generator 206 generates an interpolation frame in the interpolation phase designated by the interpolation phase control signal 107 using two frames input as the previous and next frame video signal 105, and the motion vector 106 for interpolation corresponding to the motion between the two frames, and outputs the output video signal 103.

Figure 4:
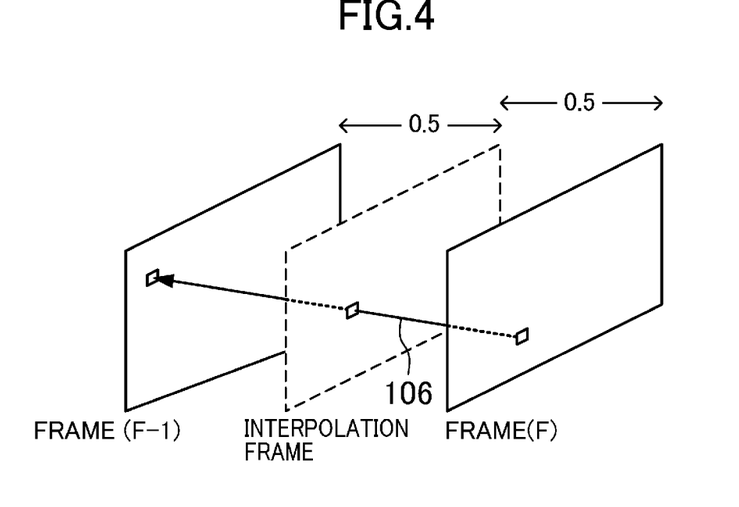
FIG. 4 illustrates an exemplary interpolation frame.

FIG. 4 illustrates an exemplary interpolation frame. As shown, the interpolation frame can be generated by moving pixels or a pixel block of at least one of the previous and next frames of the generated interpolation frame along the motion vector 106 for interpolation. At this time, the position on the time axis in which the interpolation frame is generated, i.e., the interpolation phase, can be selected between frame (F−1) and frame (F). For example, the interpolation frame may be generated using the pixels moved from only one of the frames such as the frame closer to the interpolation phase. Alternatively, the interpolation frame may be generated by mixing the pixels moved from both of the frames at a predetermined ratio or a ratio corresponding to the interpolation phase. In the example shown in FIG. 4, the interpolation frame is generated in an interpolation phase of 0.5 from frame (F−1). This processing may be repeated in each of the frames to generate the interpolation frames forming the output video signal 103.

In one implementation, the interpolation frames is generated for one of the right and left input video signals 102 and no interpolation frame is generated for the other. That is, one of the image processors 20 (e.g., the image processor 20 not generating interpolation frame) outputs the input video signal 102 without change as the output video signal 103 in synchronization with the interpolation frames output from the other image processor 20. The right and left output video signals 103 may be alternately displayed by the display 3. Since the input stereoscopic video signal 101 is converted to a stereoscopic video signal of 60 Hz by the above-described processing and displayed by the display 3, the phase of the video image is shifted by 0.5 frame. As a result, if there is an interpolation error, a deterioration in the image quality may be caused. To reduce and/or eliminate the interpolation error, the output controller 204 may monitor the value of the detected motion vector 110.

Figure 5:
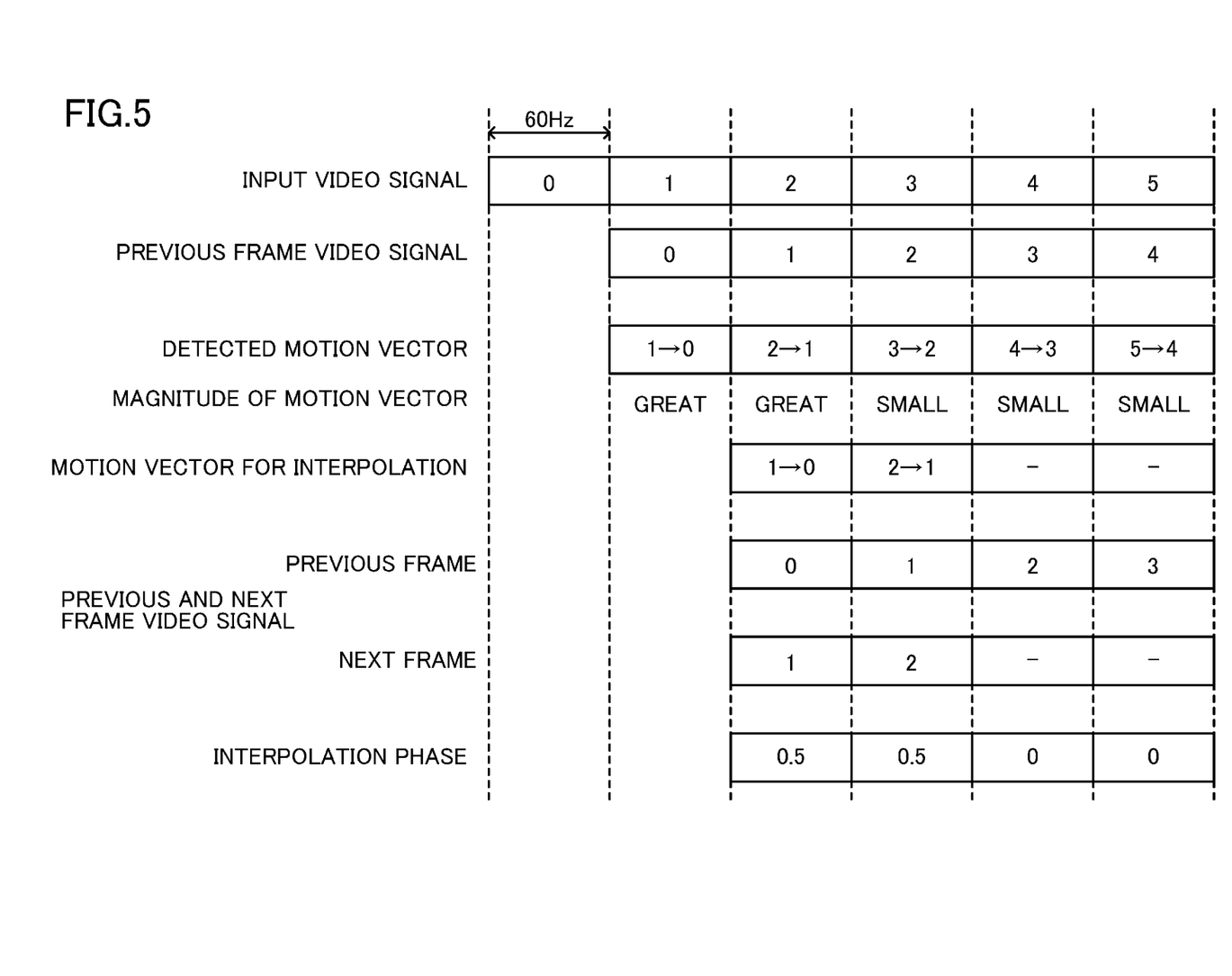
FIG. 5 illustrates an exemplary timing relationship between an input video image and generation of interpolation frames in view of a motion vector.

FIG. 5 illustrates an exemplary timing relationship between an input video image and generation of interpolation frames in view of a motion vector. As shown in FIG. 5, the output controller 204 outputs 0 as the interpolation phase control signal 107, when having determined that no motion occurs between the frames based on the average or the maximum of the motion vectors in a single frame. At this time, since there is no need to generate the interpolation frames, the output controller 204 does not output the motion vector 106 for interpolation. On the other hand, when having determined that motion occurs between the frames, the output controller 204 outputs 0.5 as the interpolation phase control signal 107 as described above with respect to FIG. 3.

To this end, in the stereoscopic video processing of the instant application, where an image includes a moving object, the phase, in which the object is displayed in accordance with the timing lag of the display, may be shifted to generate an interpolation image. This allows for display of a stereoscopic video image, while causing less eyestrain and allowing a viewer to accurately perceive the three-dimensional effect including the depth of the image. On the other hand, where the image includes no moving object, no interpolation frame may be generated, thereby reducing deterioration in the image quality caused by an interpolation error. In this manner, the stereoscopic video processing of the instant application can provide a high quality stereoscopic display and can reduce deterioration in the image quality caused by an interpolation error.

Other implementations are contemplated. For example, while in the above-described implementations, the generation of an interpolation image is determined on a frame-by-frame basis, the generation of an interpolation image may be determined on an image region-by-image region basis in a frame. The size of an image region may be equal to or different from the size of a block used for detecting a motion vector. For example, when an object crosses a motionless screen, an interpolation image may be generated for only an image region including a moving object. This implementation may allow for a high quality stereoscopic display by generating the interpolation image for the image region including the moving object. On the other hand, since the ratio of the interpolation images to the output images is low, deterioration in the image quality caused by an interpolation error can be reduced.

For another example, while in the above-described implementations, the interpolation image is generated where motion occurs in both the longitudinal and lateral directions, the phase of the output image may be controlled to generate an interpolation image only where motion occurs in a lateral direction of the frames. This implementation may enable display of a stereoscopic video image allowing a viewer to more accurately perceive the three-dimensional effect. This implementation may also reduce the ratio of the interpolation frames to the output image, thereby reducing deterioration in the image quality caused by an interpolation error. In yet another implementation, the phase of the output image may be controlled to generate the interpolation image only where motion occurs in a longitudinal direction of the frames. This implementation may enable display of a stereoscopic video image causing less eyestrain and reduce the ratio of the interpolation image to the output image, thereby reducing deterioration in the image quality caused by an interpolation error.

Whether or not motion occurs between the frames may be determined based on a value obtained by weighting and adding a component of the detected motion vector 110 in a longitudinal direction of the frames and a component of the detected motion vector 110 in a lateral direction of the frames. A viewer may feel the timing lag of display more uncomfortable in a longitudinal direction of the frames than in the lateral direction of the frames. In this case, the component in the longitudinal direction of the frames may be more heavily weighted. However, in another implementation, the component in the lateral direction of the frames may be more heavily weighted.

While in the above-described implementations, the phase of one of the right and left input video signals 102 may be shifted by 0.5 frame to generate the interpolation frames, in another implementation the interpolation frames may be generated for both the right and left input video signals 102. For example, the phase of one of the right and left input video signals 102 may be advanced by 0.25 frame and the phase of the other of the right and left input video signals 102 may be delayed by 0.25 frame to generate the interpolation frames.

This implementation may enable display of a stereoscopic video image causing less eyestrain and may allow a viewer to more accurately perceive the three-dimensional effect. Since the interpolation frames may be generated in a phase relatively close to the original frame of the input video signal 102, the influence of an incorrect motion vector may be reduced, thereby reducing deterioration in the image quality caused by an interpolation error.

Furthermore, the output controller 204 may not immediately generate the interpolation frames shifted by a 0.5 or 0.25 frame. In one specific example, the output controller 204 gradually changes the value of the interpolation phase control signal 107. To this end, the output controller 204 gradually sets the interpolation phases of the interpolation frames to 0.5 or 0.25 or close to 0.5 or 0.25 where it is determined that motion occurs between the frames. Similarly, where it is determined that no motion occurs between the frames, the output controller 206 gradually sets the interpolation phase of the interpolation frames to 0 or close to 0. As a result, display with an interpolation frame and display without an interpolation frame are smoothly switched, thereby improving the image quality.

While in the above-described implementation, an example has been described where the stereoscopic video signal 101 of 60 Hz is input, the stereoscopic video signal 101 may have other frame frequencies. For example, if the stereoscopic video signal 101 is associated with a three-dimensional movie of a frame frequency of 24 Hz, the stereoscopic video signal may be processed by the stereoscopic video processing of the instant application after converting the frame frequency to 60 Hz by 3:2 pull-down.

The timing relationship among the signals shown in FIGS. 3 and 5 is merely an example. Depending on the capacity of the video memory 202 and the vector memory 205, processing can be performed at different timing. Furthermore, the video memory 202 and the vector memory 205 may not be necessarily provided in the stereoscopic video processing system 2. Instead, external memories may be used. Furthermore, while in the above-described implementations, the stereoscopic video processing system 2 includes the two image processors 20, the stereoscopic video processing system 2 may time-share a single image processor 20 including the vector detector, the output image generator, and the output controller to process a right input video signal and a left input video signal.

Other implementations are contemplated.

What is claimed is:

1. A stereoscopic video apparatus comprising:

an input device for receiving first input frames of a first view and second input frames of a second view different from the first view, a first one frame of the first input frames and a first one frame of the second input frames having been captured at a first point in time, a second one frame of the first input frames and a second one frame of the second input frames having been captured at a second point in time after the first point in time, a first period of time being between the first point in time and the second point in time, the first one frame of the second input frames and the second one frame of the second input frames containing a subject image; and an output device for outputting first output frames of the first view and second output frames of the second view, a first one frame of the first output frames of the first view being outputted at a third point in time, a second one frame of the first output frames of the first view being outputted at a fourth point in time after the third point in time, a second period of time between the third point in time and the fourth point in time being equal to the first period of time, wherein:

the output device outputs the first one frame of the first input frames of the first view as the first one frame of the first output frames of the first view at the third point in time, and the second one frame of the first input frames of the first view as the second one frame of the first output frames of the first view at the fourth point in time, when a movement amount of the subject image between the first one frame of the second input frames of the second view and the second one frame of the second input frames of the second view is a first movement amount, the output device outputs one interpolation frame generated from the first one frame of the second input frames of the second view and the second one frame of the second input frames of the second view at a central point in time between the third point in time and the fourth point in time of the first output frames, as one frame of the second output frames of the second view, a first time lag between the first point in time and the central point in time being larger than a second time lag between the second point in time and the central point in time, and when the movement amount is a second movement amount which is smaller than the first movement amount, the output device outputs the first one frame of the second input frames of the second view, not the second one frame of the second input frames of the second view, at the central point in time with the first time lag, as one frame of the second output frames of the second view.

2. The stereoscopic video apparatus according to claim 1, wherein
the first one frame of the first input frames and the second one frame of the first input frames contain the subject image.

3. The stereoscopic video apparatus according to claim 1, wherein
the subject image comprises an image of a ball.

4. The stereoscopic video apparatus according to claim 1, wherein
the output device comprises a display.

5. The stereoscopic video apparatus according to claim 1, wherein
the input device receives the second one frame of the first input frames of the first view and the second one frame of the second input frames of the second view after the first one frame of the first input frames of the first view and the first one frame of the second input frames of the second view.

6. The stereoscopic video apparatus according to claim 1, wherein:
the output device comprises a first output device and a second output device,
the first output device outputs the first output frames of the first view, and
the second output device outputs the second output frames of the second view.

7. The stereoscopic video apparatus according to claim 1, wherein:
the first view is a view for a right eye of a user, and
the second view is a view for a left eye of the user.

8. The stereoscopic video apparatus according to claim 1, wherein:
the first view is a view for a left eye of a user, and
the second view is a view for a right eye of the user.

9. The stereoscopic video apparatus according to claim 1, further comprising:
an output image generator configured to generate the one interpolation frame from the first one frame of the second input frames of the second view and the second one frame of the second input frames of the second view according to an interpolation phase signal corresponding to an interpolation phase.

10. The stereoscopic video apparatus according to claim 9, wherein
the interpolation phase is located between the first one frame of the second input frames and a central phase, and
the central phase is located at a central point between the first one frame of the second input frames and the second one frame of the second input frames.

11. The stereoscopic video apparatus according to claim 1, further comprising:
a vector detector configured to detect the movement amount of the subject image between the first one frame of the second input frames and the second one frame of the second input frames.

12. The stereoscopic video apparatus according to claim 11, wherein:
each of the second input frames represents a rectangular shape, and
the vector detector is configured to detect the movement amount of the subject image in a long side direction of the rectangular shape.

13. The stereoscopic video apparatus according to claim 11, wherein:
each of the second input frames represents a rectangular shape, and
the vector detector is configured to detect the movement amount of the subject image in a short side direction of the rectangular shape.

14. The stereoscopic video apparatus according to claim 11, wherein:
each of the second input frames represents a rectangular shape, and
the vector detector is configured to detect the movement amount of the subject image in a long side direction and a short side direction of the rectangular shape.

15. The stereoscopic video apparatus according to claim 11, wherein:
each of the second input frames represents a rectangular shape, and
the vector detector is configured to detect the movement amount of the subject image in a long side direction of the rectangular shape, and is not configured to detect the movement amount of the subject image in a short side direction of the rectangular shape.

16. A stereoscopic video processing method for a stereoscopic video apparatus,
the stereoscopic video apparatus comprising:
an input device for receiving first input frames of a first view and second input frames of a second view different from the first view, a first one frame of the first input frames and a first one frame of the second input frames having been captured at a first point in time, a second one frame of the first input frames and a second one frame of the second input frames having been captured at a second point in time after the first point in time, a first period of time being between the first point in time and the second point in time, the first one frame of the second input frames and the second one frame of the second input frames containing a subject image; and
an output device for outputting first output frames of the first view and second output frames of the second view, a first one frame of the first output frames of the first view being outputted at a third point in time, a second one frame of the first output frames of the first view being outputted at a fourth point in time after the third point in time, a second period of time between the third point in time and the fourth point in time being equal to the first period of time, wherein:
the stereoscopic video processing method comprises:
outputting, by the output device, the first one frame of the first input frames of the first view as the first one frame of the first output frames of the first view at the third point in time, and the second one frame of the first input frames of the first view as the second one frame of the first output frames of the first view at the fourth point in time,
when a movement amount of the subject image between the first one frame of the second input frames of the second view and the second one frame of the second input frames of the second view is a first movement amount, outputting, by the output device, one interpolation frame generated from the first one frame of the second input frames of the second view and the second one frame of the second input frames of the second view at a central point in time between the third point in time and the fourth point in time of the first output frames, as one frame of the second output frames of the second view, a first time lag between the first point in time and the central point in time being larger than a second time lag between the second point in time and the central point in time, and when the movement amount is a second movement amount which is smaller than the first movement amount, outputting, by the output device, the first one frame of the second input frames of the second view, not the second one frame of the second input frames of the second view, at the central point in time with the first time lag, as one frame of the second output frames of the second view.

17. The stereoscopic video processing method according to claim 16, wherein
the first one frame of the first input frames and the second one frame of the first input frames contain the subject image.

18. The stereoscopic video processing method according to claim 16, wherein
the output device comprises a display.

19. The stereoscopic video processing method according to claim 16, further comprising:
receiving, by the input device, third one frame of the first input frames and third one frame of the second input frames at a fifth point in time, and
receiving, by the input device, fourth one frame of the first input frames and fourth one frame of the second input frames at a sixth point in time after the fifth point in time.

20. A stereoscopic video apparatus configured to:
receive first input frames of a first view and second input frames of a second view different from the first view, a first one frame of the first input frames and a first one frame of the second input frames having been captured at a first point in time, a second one frame of the first input frames and a second one frame of the second input frames having been captured at a second point in time after the first point in time, a first period of time being between the first point in time and the second point in time, the first one frame of the second input frames and the second one frame of the second input frames containing a subject image;

output first output frames of the first view and second output frames of the second view, a first one frame of the first output frames of the first view being outputted at a third point in time, a second one frame of the first output frames of the first view being outputted at a fourth point in time after the third point in time, a second period of time between the third point in time and the fourth point in time being equal to the first period of time;

output the first one frame of the first input frames of the first view as the first one frame of the first output frames of the first view at the third point in time, and the second one frame of the first input frames of the first view as the second one frame of the first output frames of the first view at the fourth point in time;

when a movement amount of the subject image between the first one frame of the second input frames of the second view and the second one frame of the second input frames of the second view is a first movement amount, output one interpolation frame generated from the first one frame of the second input frames of the second view and the second one frame of the second input frames of the second view at a central point in time between the third point in time and the fourth point in time of the first output frames, as one frame of the second output frames of the second view, a first time lag between the first point in time and the central point in time being larger than a second time lag between the second point in time and the central point in time; and when the movement amount is a second movement amount which is smaller than the first movement amount, output the first one frame of the second input frames of the second view, not the second one frame of the second input frames of the second view, at the central point in time with the first time lag, as one frame of the second output frames of the second view.

* * * * *